(No Model.)
J. H. NELLIS.
STEW OR OTHER PAN OR POT.
No. 537,546. Patented Apr. 16, 1895.
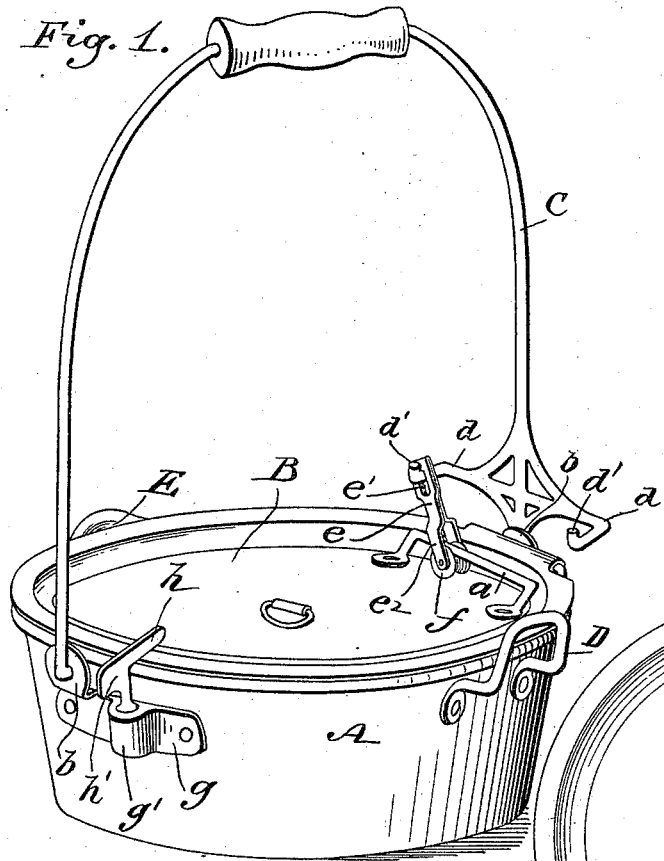
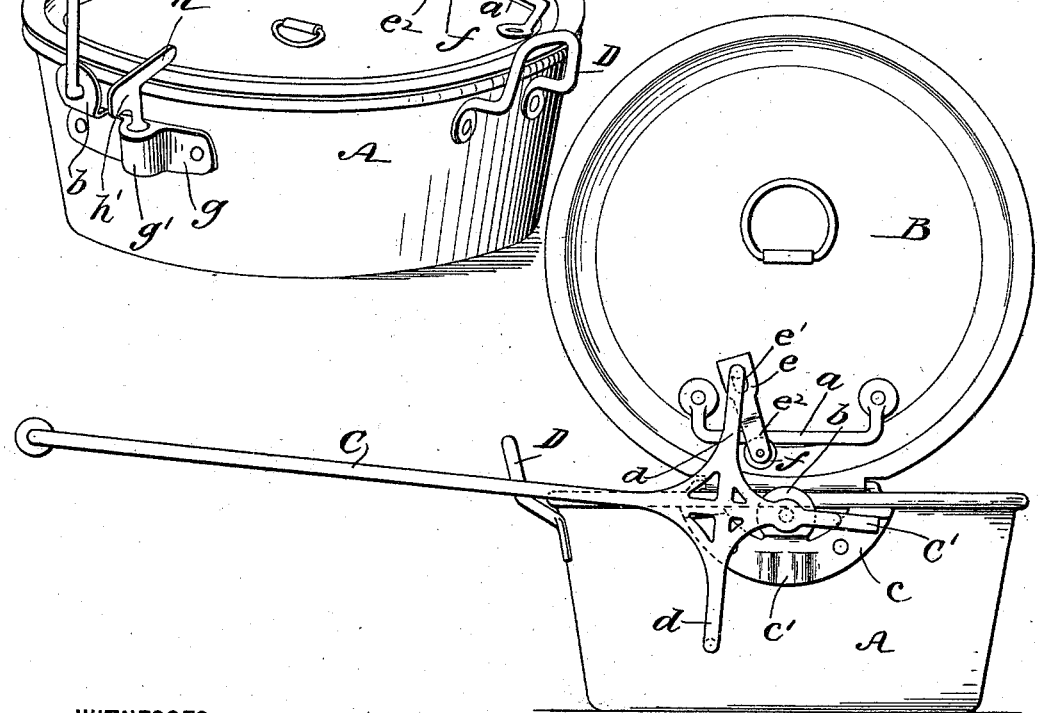
WITNESSES:
INVENTOR
Jacob H. Nellis
BY Edgar Tate & Co
ATTORNEYS

UNITED STATES PATENT OFFICE.

JACOB H. NELLIS, OF CANAJOHARIE, NEW YORK.

STEW OR OTHER PAN OR POT.

SPECIFICATION forming part of Letters Patent No. 537,546, dated April 16, 1895.

Application filed May 8, 1894. Serial No. 510,439. (No model.)

*To all whom it may concern:*

Be it known that I, JACOB H. NELLIS, a citizen of the United States, and a resident of Canajoharie, in the county of Montgomery and State of New York, have invented certain new and useful Improvements in Stew or other Pans or Pots, of which the following is a specification.

This invention relates to pots or pans, the covers or lids of which are raised and lowered by the movement of the bail or handle, and has for its object to provide a simple, cheap and readily operative device of this character whereby, upon the one hand, the cover may be raised by the lowering of the bail, and lowered by the raising of the same, and in which, upon the other hand, the cover may be locked or held in place, and the bail moved to either side, upwardly or downwardly, irrespective of the said cover; a further object of the invention being to provide means whereby the cover may be locked downward and the said bail may be also locked in a downward or horizontal position, and also held in a perpendicular position, when desired.

I am aware that pans have heretofore been made in which the cover is raised and lowered by the converse operation of the bail, but a very serious disadvantage of such a device is that when the same is suspended upon a hook against the wall, as is usually done with pans when not in use, the cover will invariably be raised by reason of the bail being lowered or parallel with the top of the pan, thus rendering the pan cumbersome and incommoding.

My invention, which is primarily designed to obviate this difficulty, besides providing other needed and important improvements, consists in the novel construction and arrangement of parts hereinafter fully described and shown.

In the accompanying drawings, forming part of this specification, in which like letters of reference designate corresponding parts throughout, Figure 1 is a perspective view of a stew pan embodying my invention, the cover thereof being locked and the bail being raised. Fig. 2 is a side elevation of the same with the cover raised and the bail lowered.

In the practice of my invention, I hinge to the pan A, at one side thereof, by any suitable means, a cover B, and upon the said cover near where the same is hinged, is riveted or otherwise attached a bar $a$, ranging parallel to the said cover, the said bar being substantially angular and raised somewhat above the level of the said cover B.

At each side of the pan A, immediately behind the hinge by which the cover is secured, and directly opposite thereto, are secured ears $b$, in which is pivoted the swinging bail C. The ear $b$ at that side of the pan to which the cover B is hinged has at the lower end thereof the segmental flange $c$, at the center of which is a depression $c'$.

Somewhat above the ear $b$, the bail C has formed thereon or secured thereto, one or more arms $d$, the ends of which are bent inwardly at right angles, and having thereon the lugs $d'$. Upon one of the said arms $d$ is hung a connecting rod $e$ having an elongated slot $e'$ in the top thereof, whereby it is suspended upon the said arm, the said connecting rod being formed at its lower end in the shape of a fork or yoke $e^2$ in which is journaled a friction roller $f$ the said roller working upon the under side of the bar $a$, which said bar passes through the fork $e^2$ thus permitting slight vertical play of the said connecting rod $e$. If desired the friction roller $f$ may be dispensed with and the fork $e^2$ be closed at the end by a bar. The bail C has upon the lower end thereof, immediately beneath the ear $b$, a lug or extension C', which said lug is so bent as to rest in the depression $c'$ in the flange $c$ as the said lug reaches the said depression upon the raising of the bail.

At the opposite side of the pan, the ear $b$ is mounted upon a flange $g$ having a shoulder or projection $g'$ thereon, toward one side of the said ear, in which shoulder is pivoted a locking arm or catch $h$, elongated at one side thereof to extend over and upon the cover B and having at the opposite side a notch $h'$, adapted to clasp over the bail C.

The operation of the device will be readily apparent from the foregoing description taken in connection with the drawings.

It being desired to raise the cover, the bail C is lowered, whereupon the arm $d$ thereon, through the agency of the connecting rod $e$, raises the said cover, permitting the pouring out of the contents of the vessel, which is tilted by means of the handle D, or the bail C locked by the catch $h$. The arms $d$ being formed upon each side of the bail-end, the connecting rod may be suspended upon either of the same thus raising the cover upon the lowering of the bail to either side, whichever is desired. The bail may however, be raised or lowered without actuating the cover by slipping off the connecting rod altogether. Should it be desired, as when boiling potatoes or similar vegetables, to pour off the liquid in the vessel without removing the solid articles, the cover is locked in place by turning the catch $h$ to the position shown in Fig. 1, and the connecting rod being detached, the pan may be tilted to pour off the liquid therein through the spout or outlet E, by grasping the handle D.

It will be observed that when the bail is raised to an exactly perpendicular position, the end C′ thereof engages in the depression $c'$ in the ear-flange $c$, thereby holding the said bail upright; and the bail may also be locked in a lowered or downward position by turning the catch $h$ in such manner that the notch $h'$ thereof fits over the bail. This is of especial convenience when the pan is to be hung up after using.

The advantages resultant from the use of my invention will be obvious to all conversant with the state of the art relative to this class of inventions, or who have had occasion to employ self-raising-covered pans in cooking, since not only may the cover be raised and lowered by the action of the bail, but may also be disconnected therefrom, and if desired, locked in a closed position, and furthermore the bail itself may be held perpendicularly, or locked downward, as hereinbefore specified.

Having thus fully described my invention, what I claim as new, and desire to secure by Letters Patent, is—

1. A pot or pan comprising a receptacle, a bail pivoted thereto and having thereon one or more horizontal forwardly projecting arms provided with lugs, a cover hinged to the said pan, a raised bar upon the cover, and a connecting rod suspended upon one of the said arms, having a closed fork at the end, which surrounds the bar and works thereon, substantially as shown and described.

2. A pot or pan comprising a receptacle, a bail pivoted thereto, and having a plurality of arms thereon, a cover hinged to the said pan, having a bar thereon, and a connecting rod detachably mounted upon one of the arms and working upon the bar, substantially as shown and described.

3. A pot or pan comprising a receptacle, a bail pivoted thereto and having a plurality of arms thereon, a cover hinged to the said pan, a raised bar upon the cover and a connecting rod mounted upon one of the said arms, the said rod being forked at the end, surrounding the bar, and having a friction-roller working therein, substantially as shown and described.

4. In a pot or pan, the combination, with a receptacle, a cover thereon, and a bail pivoted thereto, of a locking device comprising an arm pivoted to the receptacle, adapted to extend over the edge of the cover, and to engage with the bail after the same is lowered, substantially as shown and described.

5. In a pot or pan, the combination, with a receptacle having a depression in its side, a cover hinged thereto, and a bail swinging thereon, of connections from the bail to the cover whereby the same is raised and lowered by the swinging of the bail, and an extension upon the end of the bail adapted when raised to engage with the depression in the receptacle, whereby the said bail is held in the perpendicular position and the cover locked in the closed position, substantially as shown and described.

In testimony that I claim the foregoing as my invention I have signed my name, in presence of two witnesses, this 27th day of April, 1894.

JACOB H. NELLIS.

Witnesses:
P. SLOAN,
W. S. VAN WERT.